United States Patent [19]

Gyger et al.

[11] Patent Number: 5,042,262

[45] Date of Patent: Aug. 27, 1991

[54] FOOD FREEZER

[75] Inventors: Roger F. Gyger, Naperville, Ill.; Gary D. Lang, Wooster, Ohio; Kenneth L. Burgers, Oak Park, Ill.

[73] Assignee: Liquid Carbonic Corporation, Chicago, Ill.

[21] Appl. No.: 520,773

[22] Filed: May 8, 1990

[51] Int. Cl.⁵ .............................................. F25D 17/02
[52] U.S. Cl. ........................................ 62/64; 62/332; 62/381; 62/434
[58] Field of Search ............... 62/64, 333, 332, 434, 62/380, 381, 63

[56] References Cited

U.S. PATENT DOCUMENTS

| | | | |
|---|---|---|---|
| 2,402,921 | 6/1946 | Sharpe | 62/380 |
| 3,007,319 | 11/1961 | Ogden | 62/64 |
| 3,507,128 | 4/1970 | Murphy et al. | 62/332 |
| 4,127,008 | 11/1978 | Tyree, Jr. | 62/332 |

*Primary Examiner*—Ronald C. Capossela

*Attorney, Agent, or Firm*—Fitch, Even, Tabin & Flannery

[57] ABSTRACT

A food freezer having a mechanical refrigeration system comprising first and second closed-loop fluid circuits, wherein the first fluid circuit employs carbon dioxide as its refrigerant and transfers heat to the second fluid circuit, which in turn transfers heat to the environment or to another fluid circuit. In the first fluid circuit evaporator, carbon dioxide is maintained at pressures between 60.4 psig and 120 psig. In a preferred embodiment of the invention, the freezer employs at least two separate blowers or fans for circulation of air or other gas in the freezer enclosure. One blower/fan operates continuously to maintain circulation of cold air or gas in the freezer. The other blower/fan operates intermittently or at variable speeds to vary air flow across the evaporator, and thereby increase or decrease heat transfer from the freezer interior to the first fluid circuit evaporator to maintain the freezer interior at a desired temperature or within a desired temperature range.

12 Claims, 3 Drawing Sheets

FOOD FREEZER

The invention relates generally to freezers, and more particularly to a food freezing apparatus wherein cooling is provided by mechanical refrigeration.

BACKGROUND OF THE INVENTION

Freezers wherein a conveyor belt or the like transports food through a low-temperature chamber are well known in the art. As described in copending application No. 373,056, now U.S. Pat. No. 4,953,365 the disclosure of which is incorporated herein by reference, cooling of food product in such freezers is generally accomplished either by a cryogen spray or by circulation of air or other gas over the evaporator coil of a mechanical refrigeration unit.

Mechanical refrigeration for the food processing industry has generally been supplied by systems using ammonia or chloro-fluoro-carbons or chloro-fluorohydrocarbons ("CFC's/HCFC's"), e.g., R12, R22, or R502, as refrigerants in single or multi-stage systems. The refrigerant used is normally dependent on system size, cost, and expected operating conditions. Large systems, i e., those having capacities of 50 tons of refrigeration (TR) and over, typically use ammonia as the refrigerant. Smaller systems, under 50 TR, generally use CFC's/HCFC's due to cost of equipment and simplicity. For certain applications, mechanical refrigeration is preferred to cryogen injection. However, conventional mechanical refrigeration systems have disadvantages due to their use of ammonia and CFC's/HCFC's. In a food freezer plant environment, leakage of even small amounts of ammonia is annoying to workers, and large concentrations of ammonia in a worker's environment impose a health hazard. CFC's/HCFC's have higher exposure limits, but some have been found to be harmful to the environment.

It is a general object of the invention to provide a food freezer having an improved mechanical refrigeration system. Further objects and advantages of the invention will become apparent from the description set forth below and the accompanying drawing.

SUMMARY OF THE INVENTION

The invention comprises a food freezer having a low-temperature enclosure cooled by mechanical refrigeration means comprising at least two closed-loop fluid circuits arranged such that the first fluid circuit removes heat directly from the freezer, while the second fluid circuit removes heat from the first circuit.

In accordance with the invention, the first circuit employs carbon dioxide as its working fluid. The use of carbon dioxide as the refrigerant in the first circuit enables the system to achieve freezer temperatures up to about 10°-20° F. below those of earlier commercial systems employing CFC/HCFC or ammonia refrigerants, with comparable efficiency, and without the disadvantages attendant to use of ammonia or CFC/HCFC refrigerants, some of which are mentioned above. The costs of the system and its operation are comparable to or below those of conventional systems, due in part to the fact that carbon dioxide is generally less costly than ammonia, and significantly less costly than CFC/HCFC refrigerants. The carbon dioxide is maintained at pressures well above atmospheric throughout the first circuit. In the evaporator, the carbon dioxide is maintained at pressures between 60.4 psig and 120 psig. These pressures provide advantages in that relatively small diameter piping may be employed, and in that the risk of contamination of the carbon dioxide is low.

In a preferred embodiment of the invention, the freezer employs at least two separate fans or blowers for circulation of air or other gas in the freezer enclosure. One fan or blower operates continuously to maintain circulation of cold air or gas in the freezer. The other fan or blower operates intermittently or at variable speeds to vary air flow across the evaporator, and thereby increase or decrease heat transfer to maintain the freezer interior at a desired temperature or within a desired temperature range.

DETAILED DESCRIPTION OF PREFERRED EMBODIMENTS

Figure 1:
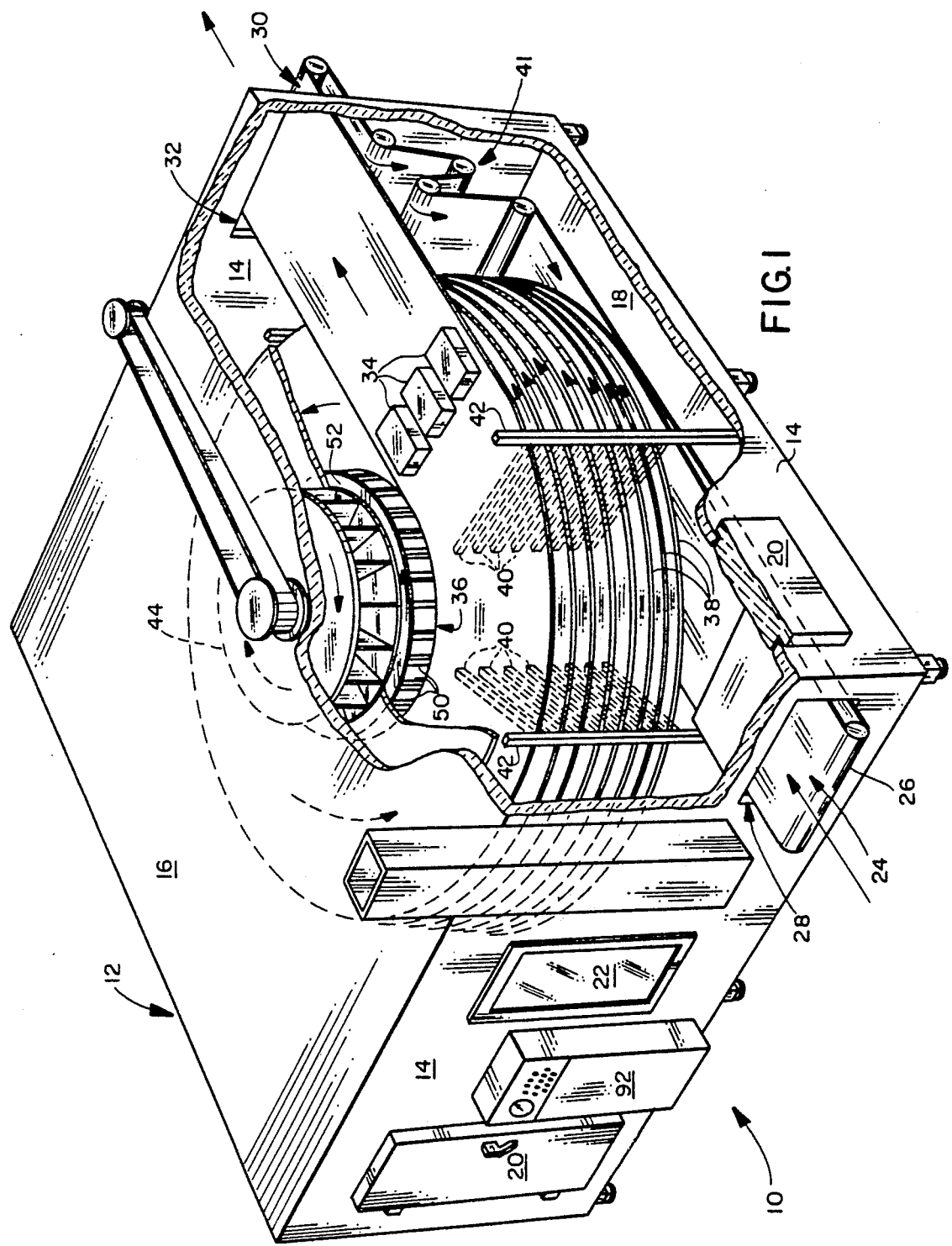
FIG. 1 is a perspective view of a conveyor freezer in accordance with the invention, shown with portions broken away to illustrate the interior thereof.

The preferred embodiment of the invention generally comprises in a freezer 10 comprising an insulated enclosure 12, means for carrying food products through the enclosure, and mechanical refrigeration means for freezing the food products during their travel through the enclosure.

The enclosure generally takes the form of a rectangular parallelepiped cabinet having four vertical sidewalls 14, a top wall 16, and a bottom wall 18, all of which are thermally insulated to facilitate maintenance of a large temperature differential between the interior and exterior of the enclosure. One or more doors 20 and windows 22 are provided to enable physical and visual access to the interior of the enclosure.

The means for conveying food products preferably comprise an endless conveyor belt 24 of known construction. The belt is arranged to provide a loading station 26 outside of the enclosure 12 adjacent an entrance opening 28 near the bottom of one of the sidewalls, and an unloading station 30 disposed outside of an exit opening 32 near the top of the opposite wall of the enclosure. For purposes of illustration, a small number of food products are illustrated at 34 in FIG. 1. In actual commercial operation, the belt carries such food products along its entire length.

The belt travels into the enclosure 12 from the loading station 26 and thence upward about a generally cylindrical central cage 36 in a helical path to define a plurality of tiers 38. A suitable tensioning mechanism 41 is provided to engage the return portion of the belt. The support mechanism and drive mechanism for the central cage are described in detail in copending application No. 373,056.

The individual tiers 38 of the belt are supported by a plurality of horizontal arms 40 which extend radially inward from a plurality of vertical posts 42 that extend between the top wall 16 and the bottom wall 18 of the enclosure 12.

The interior of the enclosure 12 is substantially filled with air or another suitable gas. Circulation of gas within the enclosure is effected by a large centrifugal fan or blower 44, which is mounted coaxially above the rotating cage 36. The fan or blower 44 draws gas upward from the interior of the cage 36 and discharges it at higher pressure in a generally horizontal, radially outward direction, throughout 360° around the centrifugal fan or blower 44. The centrifugal fan or blower is driven by a conventional belt drive 46.

Figure 2:
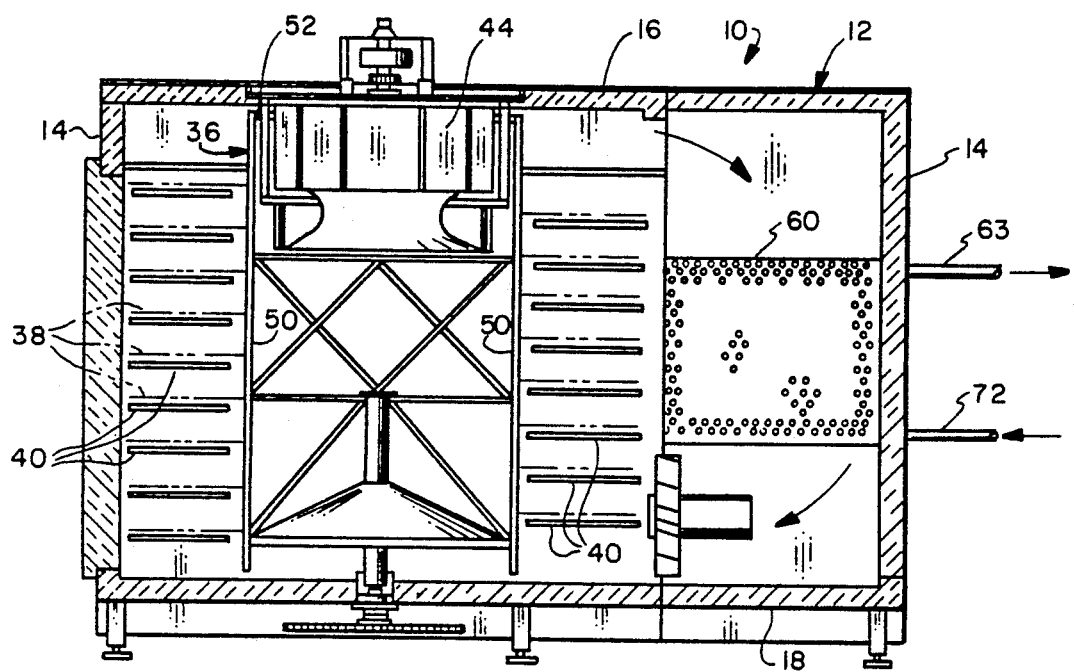
FIG. 2 is a sectional elevational view of the conveyor freezer of FIG. 1, taken substantially along line 2—2 in FIG. 3.
Figure 3:
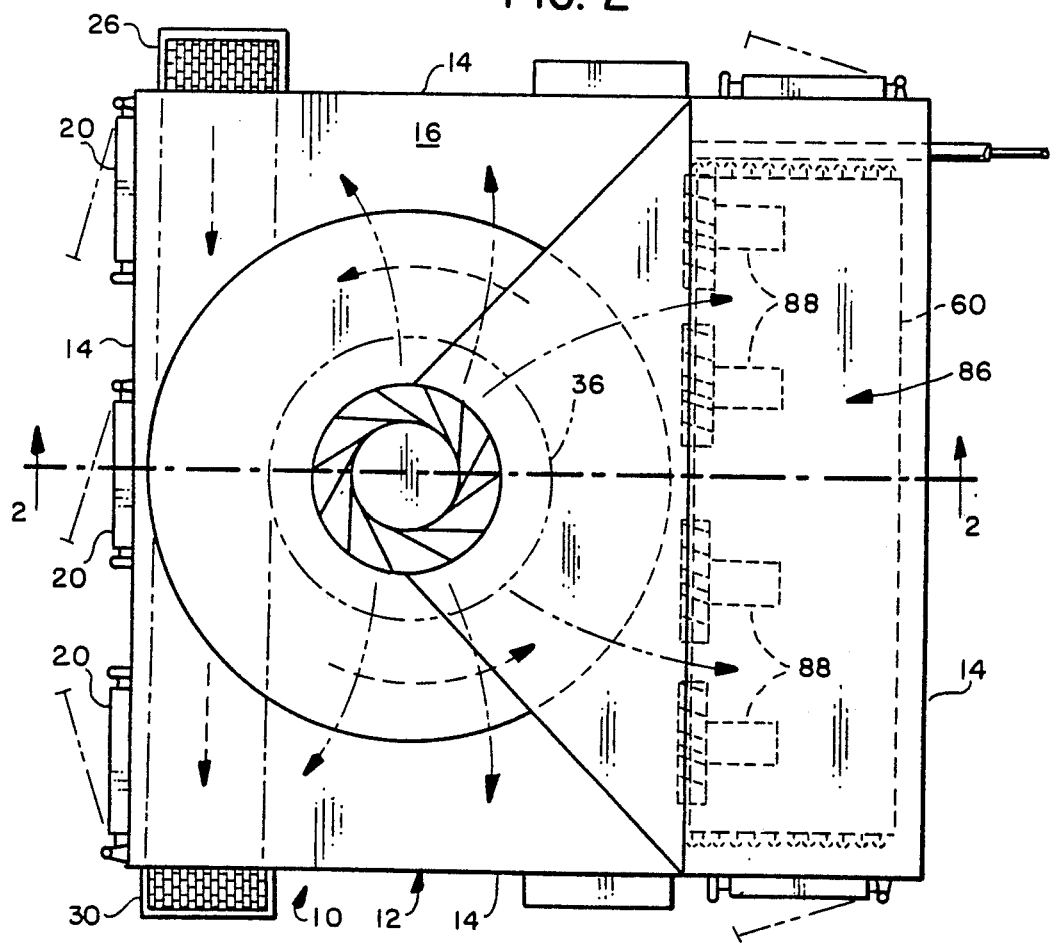
FIG. 3 is a plan view of the freezer of FIG. 1.

As illustrated in FIG. 2, the central cage 36 has a frustoconical bottom wall 48 of imperforate construction, and has its generally cylindrical shape defined by a plurality of vertical bars 50 extending upward therefrom to a generally circular upper frame member 52. This construction provides for radially inward air flow across the various tiers of belts, due to relatively low pressure in the interior of the cage 36 caused by the operation of the centrifugal fan or blower 44. The structure of the cage and various other details of the enclosure and the components contained therein are described in greater detail U.S. Pat. No. 4,953,365.

Figure 4:
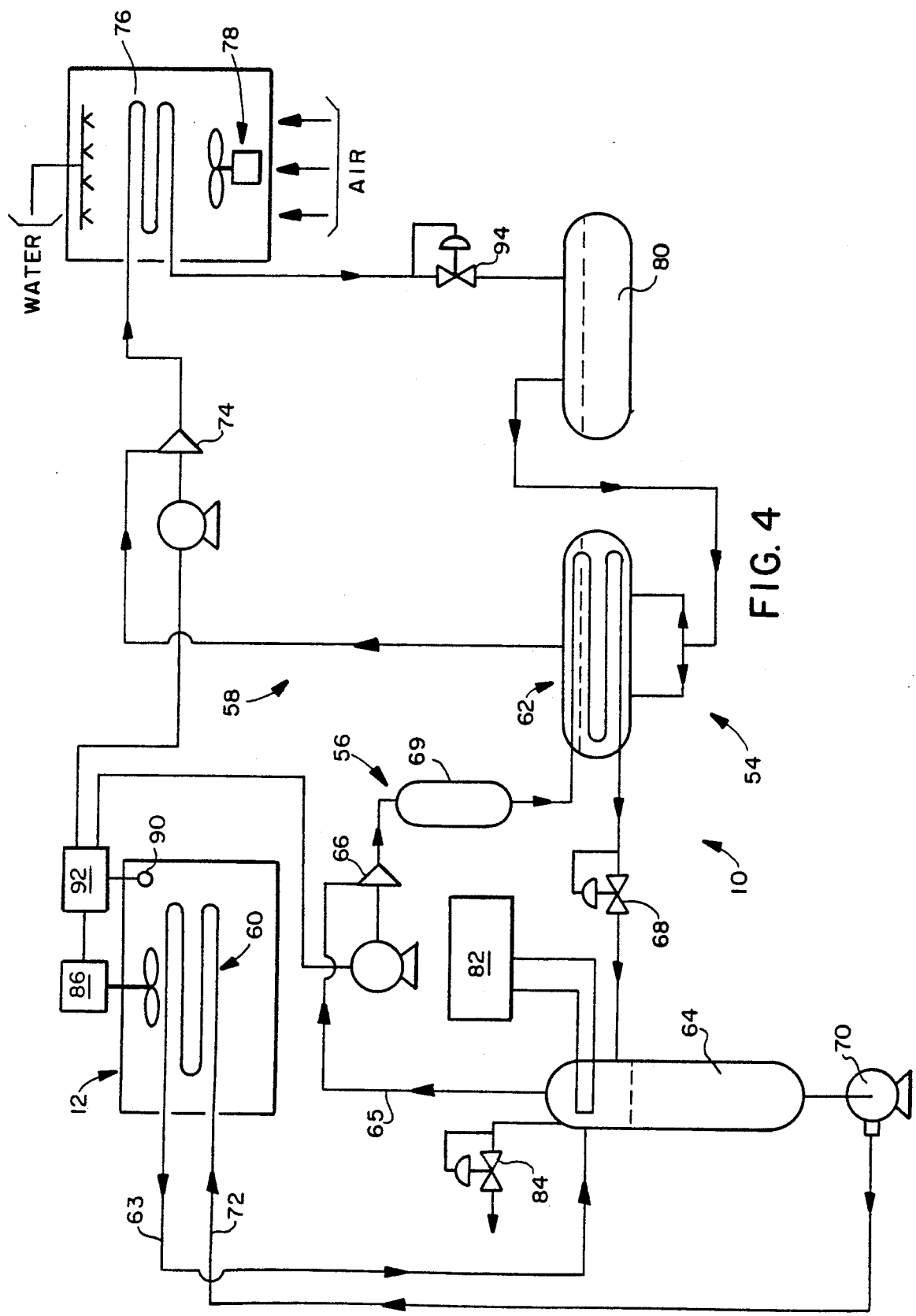
FIG. 4 is a diagrammatic view illustrating the mechanical refrigeration system employed for cooling the conveyor freezer of FIG. 1.

The circulating air in the enclosure is cooled by a mechanical refrigeration system 54 (FIG. 4) made up of two separate closed-loop fluid circuits 56 and 58. The first circuit 56 generally comprises an evaporator 60 disposed within the freezer enclosure 12 to receive heat transfer from the gas circulating therein, a heat exchanger 62 which enables heat transfer from the first circuit's refrigerant ($CO_2$) to the second fluid circuit 58, means for pumping fluid through the evaporator 60 and heat exchanger 62 and compressing the fluid as it flows from the evaporator 60 to the heat exchanger 62, and means to permit expansion of the fluid as it flows from the heat exchanger 62 to the evaporator 60.

In accordance with a feature of the invention, the working fluid in the first fluid circuit 56 is carbon dioxide, and is maintained at a pressure of between 60.4 and 120 psig as it flows through the evaporator 60. Maintenance of liquid/vapor equilibrium through the evaporator enables relatively high heat transfer rates to be achieved due to the wetting of the interior surfaces of the evaporator coils. Operation under the above conditions enables achievement of freezer temperatures comparable to or lower than those achievable with conventional mechanical refrigeration systems with CFC/HCFC or ammonia refrigerants, while avoiding solids-handling problems that would arise in utilization of carbon dioxide at or below the triple point ($-69.90$ F., corresponding to a pressure of 60.4 psig). In one preferred embodiment, the liquid carbon dioxide enters the evaporator at about 65 psig and about $-67°$ F. The pressure drop across the evaporator 60 is relatively small, e.g., about 2 psi. Accordingly, liquid carbon dioxide entering the evaporator at about 65 psig and $-67°$ F. is partially vaporized as it begins to flow through the evaporator, and remains in liquid/vapor equilibrium throughout the evaporator.

As the $CO_2$ refrigerant is discharged from the evaporator, it remains in liquid/vapor equilibrium. The $CO_2$ flows from the evaporator 60 through suitable piping 63 to a receiver 64 in which the liquid component is separated and collected. The vapor component flows through suitable piping 65 from the receiver 64 to a compressor 66. The compressor 66 increases the pressure of the vapor to about 290-325 psig. The vapor next passes through an oil separator/filter 69, then enters the heat exchanger 62, which enables transfer of heat from the first circuit to the second refrigerant circuit. The heat exchanger 62 may be of tube-and-shell construction, or other suitable design. The first circuit's $CO_2$ vapor is condensed in the heat exchanger 62, and exits at a temperature of about 0° F., with a slight loss of pressure as it travels through the heat exchanger.

The resulting liquid $CO_2$ flows from the heat exchanger 62 through a control valve 68 where pressure is decreased to between 60.4 and 120 psig, with a portion of the $CO_2$ being flashed to vapor, and decreases its temperature accordingly. The resulting liquid/vapor $CO_2$ flows into the receiver 64, where the liquid and vapor components are separated. The vapor component is recirculated back to the compressor through piping 65 with the vapor discharged from the evaporator. The liquid component is advanced by a pump 70 through suitable piping 72 to the evaporator 60.

During periods when the system is not operating, the pressure in the carbon dioxide receiver 64 is preferably maintained at less than 250 psig by a small mechanical refrigeration u and/or a pressure-controlled relief regulator 84. This enables a relatively lightweight vesse be used for the receiver 64.

The second circuit as noted above, removes heat from the $CO_2$ in the circuit refrigerant in the heat exchanger 62. As the second circuit refrigerant flows through the heat exchanger 62 in thermal communication with the $CO_2$ refrigerant in the first circuit, a substantial of the second circuit's refrigerant is evaporated. The second circuit's refrigerant then flows a compressor 74, then through a condenser 76, where heat is transferred to the environment from the second circuit's refrigerant. The second circuit's condenser preferably includes a conventional condenser coil, and may have water sprayed thereon while air is blown over its exterior by a fan or blower 78 to provide efficient cooling. The liquid refrigerant then flows from condenser 76 through a control valve 94 to a receiver 80, and from the receiver back to the heat exchanger 62.

The means for circulating gas within the freezer enclosure 12 preferably includes at least two fan/blower units, one being the centrifugal fan or blower 44 described above, which operates at a substantially constant speed. The second fan/blower unit 86 preferably comprises one or more fans or blowers 88 disposed at the lower end of the freezer enclosure 12 for inducing flow downward over the evaporator 60. The second unit 86 may be controllable to operate intermittently or at variable speed, as desired, to maintain a desired temperature or temperature range in the freezer enclosure 12. To this end, a temperature sensor 90 disposed in the enclosure 12 transmits temperature information to a control system 92 which regulates operation of the second fan/blower unit 86. In the illustrated embodiment, the compressors 66 and 74 are also regulated by the control system 92. This enables a desired freezer temperature to be maintained with relatively high-efficiency operation despite variations in heat load on the freezer (due to, e.g., variations in entry temperature and heat capacity of the food products being frozen) and despite variations in the temperature of the ambient air which cools the second circuit condenser.

From the foregoing it will be appreciated that the invention provides a novel and improved food freezer employing mechanical refrigeration. The use of carbon dioxide as the first circuit's refrigerant enables achievement of freezer evaporator temperatures of as much as 10° to 20° F. below those of commercially-available systems using ammonia or CFC/HCFC refrigerants, at comparable costs and efficiencies, but without the disadvantages associated with using ammonia or CFC/HCFC refrigerants.

The invention is not limited to the embodiment described above or to any particular embodiment. For example, rather than employing only two fluid circuits as described above, the mechanical refrigeration system might employ 3, 4 or more fluid circuits, with the second circuit transferring heat to the third circuit, the third circuit transferring heat to the fourth circuit, and so on. Also, it should be appreciated the terms "fan" and "blower" are used interchangeably herein. The invention is defined by the following claims.

What is claimed is:

1. A food freezer comprising:
   an enclosure;
   conveyor means for supporting food products within said enclosure and carrying said food products therethrough;
   mechanical refrigeration means for freezing said food products as they are carried through said enclosure, said mechanical refrigeration means comprising:
   a first heat transfer fluid;
   a first closed refrigeration circuit containing said heat transfer fluid, comprising a first evaporator disposed within said enclosure, a first condenser disposed outside of said enclosure, means to effect flow of said first heat transfer fluid through said first evaporator and said first condenser, and a compressor to compress fluid entering said first condenser;
   means to effect heat transfer from said food products to said first heat transfer fluid in said first evaporator so as to evaporate fluid therein without direct contact between said food products and said first heat transfer fluid, comprising a gas within said enclosure and blower/fan means for effecting gas flow over said first evaporator and said food products within said enclosure;
   a second closed refrigeration circuit comprising a second heat transfer fluid, a second evaporator disposed in thermal communications with said first condenser, a second condenser, and means to convey said second heat transfer fluid through said second refrigeration circuit so as to effect transfer of heat from said first heat transfer fluid to said second heat transfer fluid; and
   means tor emove heat from said second condenser;
   wherein said first heat transfer fluid consists essentially of $CO_2$ and is maintained at pressures of between 60.4 psig and 120 psig while in said first evaporator.

2. A food freezer in accordance with claim 1 wherein said first heat transfer fluid is maintained at about 65 psig in said first evaporator.

3. A food freezer in accordance with claim 1 wherein said blower/fan means includes at least one blower/fan for regulating the rate of air flow over said first evaporator, further comprising means for regulating operation of said blower/fan to maintain a desired temperature range within said enclosure.

4. A food freezer in accordance with claim 3 further comprising control means to regulate flow rates of $CO_2$ through the first evaporator in response to variations in heat load to maintain a desired temperature within said enclosure.

5. A food freezer in accordance with claim 1 wherein said first heat transfer fluid is maintained at pressures of between 60.4 psig and about 325 psig throughout said first fluid circuit.

6. A food freezer in accordance with claim 1 wherein said first heat transfer fluid is maintained in liquid/vapor equilibrium throughout said evaporator.

7. A food freezer in accordance with claim 1 wherein a single heat exchanger includes said first condenser and said second evaporator.

8. A food freezer in accordance with claim 1 further comprising a receiver which receives outflow from said condenser, and means to effect flow of vapor from said receiver to said compressor.

9. A food freezer in accordance with claim 8 further comprising a mechanical refrigeration unit to remove heat from said receiver and condense vapor in said receiver during periods when said food freezer is not operating.

10. A method of freezing food products comprising:
    placing said food products in an insulated enclosure;
    maintaining a quantity of carbon dioxide at pressures above atmospheric pressure within a closed refrigeration circuit comprising an evaporator disposed within said enclosure and a heat exchanger disposed outside of said enclosure;
    effecting flow of carbon dioxide in liquid/vapor equilibrium through said evaporator at a pressure of between 60.4 psig and 120 psig;
    compressing said carbon dioxide after discharge thereof from said evaporator, then cooling and condensing said carbon dioxide in said heat exchanger, then reducing the pressure of said carbon dioxide and returning at least a portion thereof to said evaporator;
    conveying a second refrigerant through a closed refrigeration cycle in which heat is transferred from said first refrigerant to said second refrigerant in said heat exchanger, and wherein heat is transferred from said second refrigerant to a third fluid; and
    effecting transfer of heat from said food products to said first heat transfer fluid in said evaporator without direct contact therebetween by effecting flow of a gas within said enclosure in thermal communication with said food products and exterior surfaces of said evaporator.

11. A method in accordance with claim 10 wherein said carbon dioxide is pumped through said evaporator at about 65 psig.

12. A method in accqrdance with claim 11 further comprising the steps of measuring the temperature at a predetermined point in said insulated enclosure, and regulating said temperature by varying the flow of gas in thermal communication with said evaporator.

* * * * *

UNITED STATES PATENT AND TRADEMARK OFFICE
CERTIFICATE OF CORRECTION

PATENT NO.    : 5,042,262
DATED         : August 27, 1991
INVENTOR(S)   : Gyger, et al.

It is certified that error appears in the above-identified patent and that said Letters Patent is hereby corrected as shown below:

Column 3, Line 20, after "detail" insert --in--.

Column 4, Line 19, change "u and/or" to --unit 82, and/or--.

Column 4, Line 20, change "vesse be" to --vessel to be--.

Column 4, Line 22, change "circuit as" to --circuit 58, as--.

Column 4, Line 23, change "in the circuit" to --in the first circuit--.

Column 4, Lines 26-27, after "substantial" insert --portion--.

Column 4, Line 28, after "flows" insert --through--.

Column 4, Line 35, after "from" insert --the--.

Column 5, Line 42, change "communications" to --communication--.

Column 5, Line 48, change "tor emove" to --to remove--.

UNITED STATES PATENT AND TRADEMARK OFFICE
CERTIFICATE OF CORRECTION

PATENT NO. : 5,042,262

DATED : August 27, 1991

INVENTOR(S) : Gyger, et. al.

It is certified that error appears in the above-identified patent and that said Letters Patent is hereby corrected as shown below:

Column 6, line 56, change "accqrdance" to --accordance--.

Signed and Sealed this

Twenty-third Day of February, 1993

Attest:

STEPHEN G. KUNIN

*Attesting Officer*  *Acting Commissioner of Patents and Trademarks*